Patented July 10, 1923.

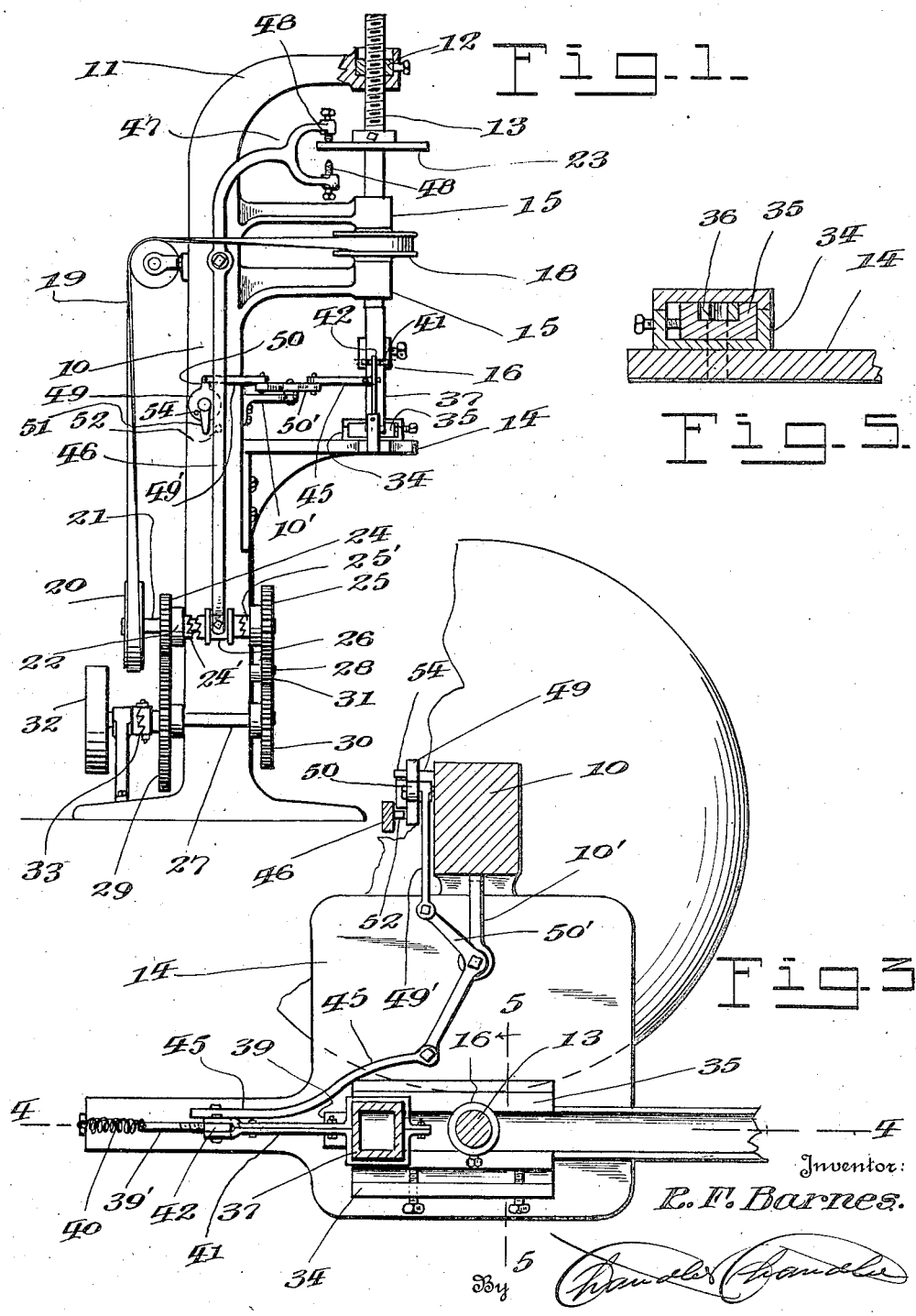

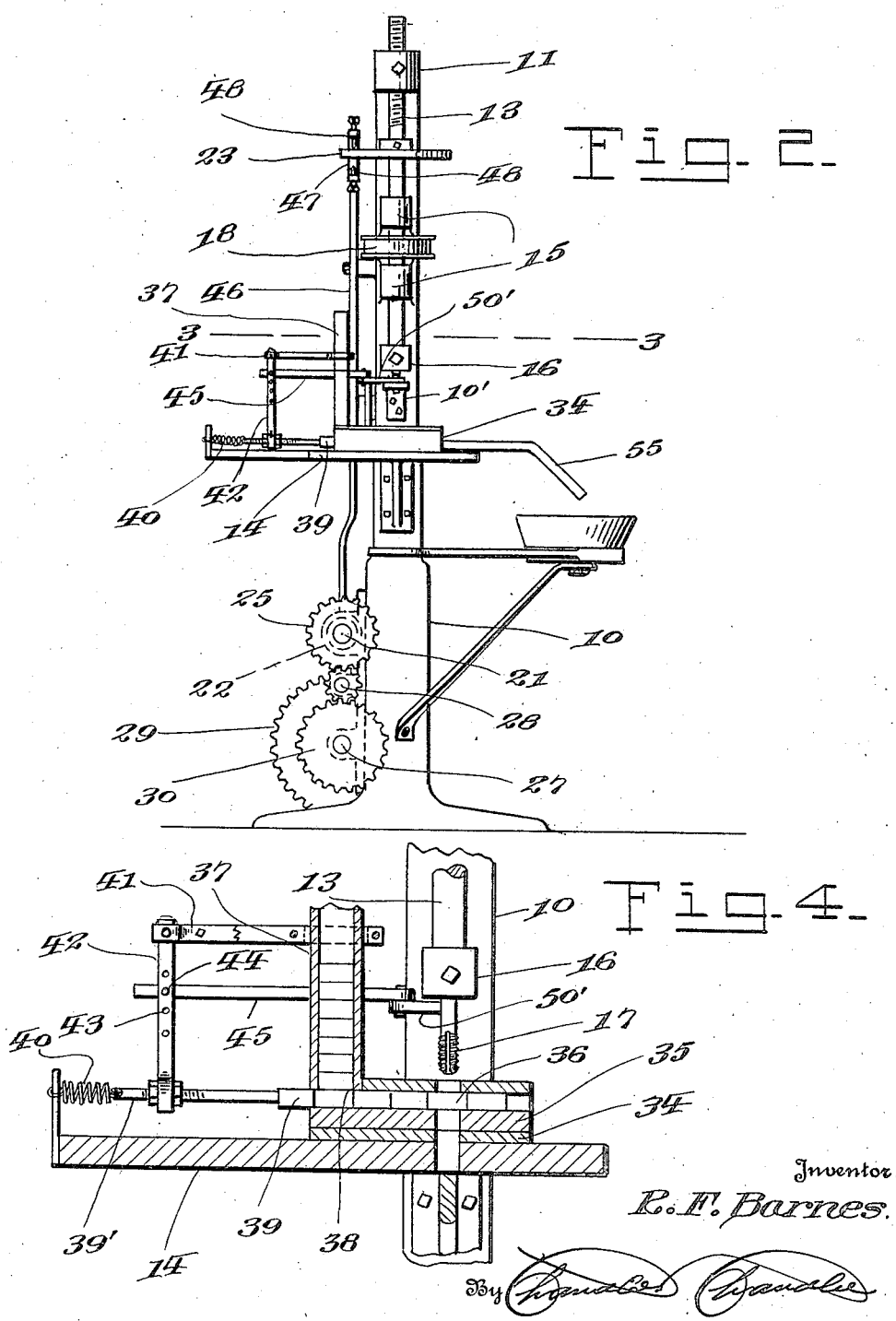

1,461,171

UNITED STATES PATENT OFFICE.

RUFUS F. BARNES, OF SPRINGFIELD, MASSACHUSETTS.

NUT-TAPPING MACHINE.

Application filed March 16, 1921. Serial No. 452,861.

*To whom it may concern:*

Be it known that I, RUFUS F. BARNES, a citizen of the United States, residing at Springfield, in the county of Hampden, State of Massachusetts, have invented certain new and useful Improvements in Nut-Tapping Machines; and I do hereby declare the following to be a full, clear, and exact description of the invention, such as will enable others skilled in the art to which it appertains to make and use the same.

This invention relates to new and useful improvements in nut tapping machines.

One object of the invention is to provide a machine of this character wherein the tap is fed down through the bore of the nut at a slow speed, and fed or drawn upwardly out of the nut at a high speed.

Another object is to provide a machine of this character wherein the change of speed is accomplished automatically by the movement of the tap holding shaft or spindle.

Another object is to provide means for automatically feeding the nut blanks into position beneath the tap, said feeding means being operable by the means which automatically shifts or changes the gear from low to high.

A further object resides in the provision of means for accommodating nut blanks of different sizes and means for regulating the action of the feeding means in accordance with the size of the nut blanks.

Other objects and advantages will be apparent from the following description when taken in connection with the accompanying drawings.

In the drawings:

Figure 1 is a side elevation of a nut tapping machine made in accordance with the invention.

Figure 2 is a front elevation of the same.

Figure 3 is a horizontal transverse sectional view above the nut blank feeding mechanism, on the line 3—3 of Figure 2.

Figure 4 is a vertical longitudinal central sectional view through the nut feeding mechanism, on the line 4—4 of Figure 3.

Figure 5 is a vertical transverse sectional view through the nut blank channel, on the line 5—5 of Figure 3.

Referring particularly to the accompanying drawings, 10 represents a standard having a horizontally extending arm 11 at its upper end in which is formed a vertical threaded and removable nut 12 for the passage of the upper threaded portion of the removable stem 13. Carried by the standard, at a suitable distance below the arm 11, and extending in the same direction thereof, is a table 14. Extending outwardly from the standard, below the arm 11 are the vertically aligned arms or brackets 15 through which the stem 13 is rotatably disposed. The lower end of the stem is provided with a chuck 16 to hold the tap 17. The thread of the tap 17 and of the nut 12 are the same pitch. Secured on the stem or spindle 13, between the brackets 15, is a belt wheel 18 driven by the belt 19, from the wheel 20, carried by the shaft 21, which is supported in the bracket 22, on the standard 10. Also secured on the spindle 13, above the upper bracket 15, for rotation with the said spindle, is a horizontal disk 23.

On the opposite ends of the shaft 21 are secured the gears 24 and 25, respectively, the inner portion of the former gear having a clutch face 24' while the latter gear has the inner clutch face 25'. Slidable on the shaft 21, between the clutch faces 24' and 25', is a double-ended clutch sleeve 26 arranged to engage first one gear face and then the other, as the sleeve is slipped along the shaft.

Also mounted in the bracket 22 are the shafts 27 and 28, disposed in parallel relation to the shaft 21. On the ends of the shaft 27 are the gears 29 and 30, respectively, the former being larger than the latter and meshing with the gear 24, of the shaft 21, while the latter meshes with the small intermediate gear 31, on the shaft 28. The shaft 27 has a drive pulley 32 on one end which receives power from a suitable source, and which is provided with a clutch 33, whereby the power may be thrown in and out.

Detachably mounted on the table 14 is a longitudinally channeled block 34, and within the block 34 is a second narrower and longitudinally channeled block 35, through which the nut blanks 36 pass. Set screws are disposed through one side of the block 34 for engagement against the adjacent side of the inner block 35, to hold the latter in proper position. Supported over one end of the blocks 34 and 35, is a vertical tube 37 in which are disposed the nut blanks 36, the lower end of said tube being formed with a side opening 38 to permit one blank at a time to drop from the tube into the channel of the inner block 35.

Supported on the table, at one end of the channel of the block 35, and slidable therein, is a pusher or plunger 39, behind the other end of which is disposed a spring 40 which normally exerts pull to draw the plunger back and dispose its forward end behind a nut blank in the lower end of the tube 37. Pivotally supported at its upper end in a bracket 41, is a depending lever 42, the lower end of which is pivotally connected with the stem 39' of the plunger 39. The lever 42, below its pivot, is formed with a longitudinal series of openings 43, carrying in one of them a pivot pin 44 to which is connected a link 45. Pivotally supported on the standard 10 is a vertical lever 46, the upper end of which is turned in a direction toward the stem 13, and is bifurcated, as shown at 47. This bifurcation straddles the edge portion of the disk 23, and each furcation carries a vertical screw 48 for engagement with one face of the disk. The lower end of the lever 46 is also bifurcated and straddles the double clutch sleeve 26, so that when the disk 23 rises and falls, with the vertical movement of the stem 13, the one screw 48, or the other one will be engaged by the disk and the lever rocked, with the result that the sleeve 26 will be slipped along the shaft 21, and one or the other of its ends engaged with a clutch face of a gear, of said shaft. Mounted for rotation on the standard 10, adjacent the lever 46, and below the pivot thereof, is a vertical disk 49, having formed on its periphery the radially extending arm 50, which is pivotally connected with the other end of the before-mentioned link 45, by means of the link 49' and the bell crank 50', the latter which is supported on the bracket 10' carried by the standard 10. Loosely mounted on the shaft of the disk 49 is a depending arm 51, the outer end of which projects beyond the edge of the disk in the path of a laterally extending pin 52 carried by the portion of the lever 46, below the pivot of said lever. A spring 53, connected to the arm 51, and to the standard 10, normally and yieldably holds said arm against a pin 54 which projects from one of the faces of the disk. Thus, when the lever 46 moves in one direction its pin 52 will engage with the arm 51, which by means of its contact with the pin 54, will swing the arm and cause the disk to rotate a certain distance. As the disk turns the link 45 will cause the lever 42 to rock on its pivot and move the plunger 39 forwardly, with the result that the lowermost nut blank in the tube or magazine 37 will be pushed into the channel of the block 35, and the blank which has been tapped moved from beneath the tap and along the channel toward the chute 55, mounted on the table at the other end of the channel, from which the first nut will drop into a receptacle placed therebelow. When the lever 46 moves in the opposite direction, its pin 52 will engage with the arm 51 and rock the same on the disk shaft without affecting the disk.

It will be readily seen that when the tap spindle is moving downwardly, with the tap operatively engaged in the opening of the nut blank, to cut threads therein, the disk 23 is moving toward the lower screw of the forked end of the lever 46. When the disk engages with the said screw and rocks the lever 46 on its pivot, the other end of the lever will shift the sleeve 26. In the downward movement of the tap spindle, the clutch sleeve 26 in engagement with the clutch face of the gear 25 will be driven so that the speed of the spindle will be constant and with the speed of the threads of the nut 12, and the threads of the tap. When the tap has finished its cutting action the disk 23 will have engaged the upper arm of the forked end of the lever 46, with the result that the lever 46 is rocked to shift the sleeve 26 into engagement with the clutch face of the other gear 24, with the further result that the spindle will be driven upwardly, and the tap backed out of the nut at a high speed. As the spindle rises, and at the time that the tap is completely out of the opening of the nut, the pin 52 of the lever 46 will have engaged with the arm 51 and rocked the disk 49, so that the plunger has been moved forwardly to advance a new nut blank into position beneath the tap, and the finished nut moved along toward the chute 55.

It will be understood that once the magazine tube 37 is filled with nut blanks, and the power applied, the machine will perform all of the functions just described, automatically and without attention.

What is claimed is:

1. A nut tapping machine, including a rotatable and vertically movable tap carrying spindle, gearing for driving the spindle in opposite directions to move the tap into and out of a nut blank, a gear shifting lever operable by the spindle upon vertical movement thereof to change the gearing from low to high and vice versa, a nut blank feeding mechanism, and means operable by the shifting lever upon movement of the lever by the spindle to actuate the feeding mechanism.

2. A nut tapping machine including a rotatable and vertically reciprocable tap carrying spindle, a driving gear for the spindle for moving the spindle downwardly at low speed and upwardly at high speed, a shifting lever operable by the spindle for shifting the gear from high to low and vice versa, a nut blank magazine, a plunger for pushing the blanks successively beneath the tap, and means operatively connected with the plunger and engageable by the shifting lever for actuating the plunger.

3. In a nut tapping machine the combination with a tap spindle and a gear shifting lever operable thereby, of a nut blank feeding mechanism including a magazine, a spring retracted plunger arranged to push the blanks from the magazine, a lever operatively connected with the plunger, a rotatable element connected with the plunger lever, and means on the gear shifting lever for engagement with the rotatable element for advancing the plunger into nut blank feeding position.

4. In a nut tapping machine, the combination with a tap spindle and a gear shifting lever operable thereby, of a nut blank feeding mechanism including a magazine, a plunger operable to push the blanks successively from the magazine into position beneath the tap, a rotatable element having a radial arm, a pivoted lever connected with the plunger, a spring for retracting the plunger into position behind a nut blank, and a pin on the shift-lever for moving the disk to actuate the plunger.

In testimony whereof, I affix my signature, in the presence of two witnesses.

RUFUS F. BARNES.

Witnesses:
SYDNEY B. HILLARD,
MINNIE F. BARNES.